United States Patent [19]
Grippo

[11] Patent Number: 5,876,080
[45] Date of Patent: Mar. 2, 1999

[54] TOOL FOR REMOVING VEHICLE WHEEL COVERS

[76] Inventor: James P. Grippo, 2290 William Penn Hwy., Pittsburgh, Pa. 15235

[21] Appl. No.: 951,224

[22] Filed: Oct. 16, 1997

[51] Int. Cl.[6] ....................................................... B65G 7/12
[52] U.S. Cl. ............................ 294/26; 29/245; 301/37.33
[58] Field of Search .............................. 294/15, 17, 19.1, 294/26; 254/120, 131; 301/37.28, 37.32, 37.33, 37.42; 29/245, 278; 81/488

[56] References Cited

U.S. PATENT DOCUMENTS

| | | | |
|---|---|---|---|
| 748,953 | 1/1904 | Jacobs | 294/26 |
| 1,484,495 | 2/1924 | Hatherley | 294/26 |
| 2,482,314 | 9/1949 | Beckwell | 294/26 |
| 2,488,312 | 11/1949 | Millican et al. | 294/26 |
| 2,702,941 | 3/1955 | Hale | 294/26 |
| 2,805,882 | 9/1957 | Bohenek | 294/15 |
| 3,164,893 | 1/1965 | Ashworth | 29/245 |
| 3,385,625 | 5/1968 | Heines | 294/26 |
| 3,934,853 | 1/1976 | Orsburn | 254/131 |
| 4,691,465 | 9/1987 | Dooley | 294/26 |
| 5,201,559 | 4/1993 | Boring et al. | 294/26 |
| 5,305,960 | 4/1994 | Healey | 294/26 |
| 5,439,263 | 8/1995 | Chambers | 294/26 |
| 5,660,099 | 8/1997 | Figueira, Jr. | 294/26 |

*Primary Examiner*—Dean Kramer
*Attorney, Agent, or Firm*—James Ray & Associates

[57] ABSTRACT

A tool for removing a wheel cover from a wheel of a vehicle. The tool comprises an elongated metal rod having a hook at one end of the rod and a handle portion at the other end of the rod for grasping the tool. The hook end of the rod is adapted to engage a metal retention ring that secures the wheel cover to the wheel. By pulling the tool crosswise of the wheel, the retention ring is pulled away from a rim of the wheel and toward the center of the wheel to release the wheel cover from the wheel.

1 Claim, 3 Drawing Sheets

TOOL FOR REMOVING VEHICLE WHEEL COVERS

FIELD OF THE INVENTION

The present invention relates, generally, to the removal of wheel covers from vehicle wheels and, particularly, to a hand tool that greatly facilitates such removal over presently available devices for effecting such removal. Removal of a wheel cover is necessitated, for example, when access to wheel retaining lugs is needed.

BACKGROUND OF THE INVENTION

Generally, removable wheel covers on passenger and other vehicles are held in place by a circular, continuous retention ring made of hard, durable wire rod stock that seats inside a plurality of peripherally spaced retention teeth or fingers generally formed in an integral manner with the wheel covers, particularly plastic wheel covers. The teeth engage an inwardly facing, continuous, circular surface of the wheel's rim under substantial force provided by the retention ring, i.e., the ring has a diameter that is sized to force the integral teeth outwardly such that they firmly engage the inwardly facing surface of the wheel's rim.

Car manufacturers usually provide a flat edge tool for insertion between the edge of a wheel cover and the wheel rim to pry the cover from the wheel. Such devices can nick, bend and even break the covers in an effort to remove the covers from the wheel rim, as the force on the integral teeth of the cover in engaging the inner surface of the rim, as provided by the retention ring, makes the cover removal process difficult. It can be appreciated that such a retention ring has to exert a substantial force on the wheel cover in order to sustain retention of the cover in the wheel under hazardous and rough road conditions. Otherwise, wheel covers would easily come loose and often be lost to the owners of the motor vehicles.

A further concern with the use of prying devices is the possibility of personal injury, i.e., in endeavoring to force a flat edge tool between a wheel cover and wheel, the tool can slip and injure the hand of the user of the tool.

Another concern involves the wear of the plastic retention teeth that can occur with repeated removal from and insertion of the wheel cover into a wheel rim. Over time, such wear reduces the ability of the retention teeth to retain the cover in the wheel.

SUMMARY OF THE INVENTION

The present invention discloses a simple tool with a hook end for insertion through an opening in a wheel cover to engage the retention ring for the purpose of moving the retention teeth from engagement with the rim of the wheel. The other end of the tool has a handle that allows the user of the tool to grasp and pull the tool crosswise of the wheel and thereby pull the retention ring inwardly toward the center of the wheel. This releases the retention teeth located near the point of engagement of the tool from the inside surface of the rim such that the cover is loosened and then easily separated from the wheel.

OBJECTIVES OF THE INVENTION

It is, therefore, an objective of the invention to provide a simple tool for engaging retention rings that are employed to secure removable wheel covers to wheels for the purpose of removing retaining force on retention teeth in a manner that permits easy and simple removal of such covers from vehicle wheels.

It is another objective of the invention to provide such a tool with a hook end that is offset from the longitudinal axis of the tool to facilitate engaging retention rings and effecting release of the retention teeth.

A further objective of the invention is to use the offset end of the tool to engage an offset portion of retention rings that is provided to accommodate valve stem extending from the inside surface of wheel rims.

Another objective of the invention is to provide a simple tool made of an elongated piece of durable metal rod material with a handle at one end of the rod material for gripping the tool and a hook portion at the other end for engaging a retention ring, the ring being located and secured to and behind a removable cover of a vehicle wheel.

THE DRAWINGS

The invention, along with it's objectives and advantages, will be better understood from consideration of the following detailed description and the accompanying drawings in which.

PREFERRED EMBODIMENT OF THE INVENTION

Figure 1:
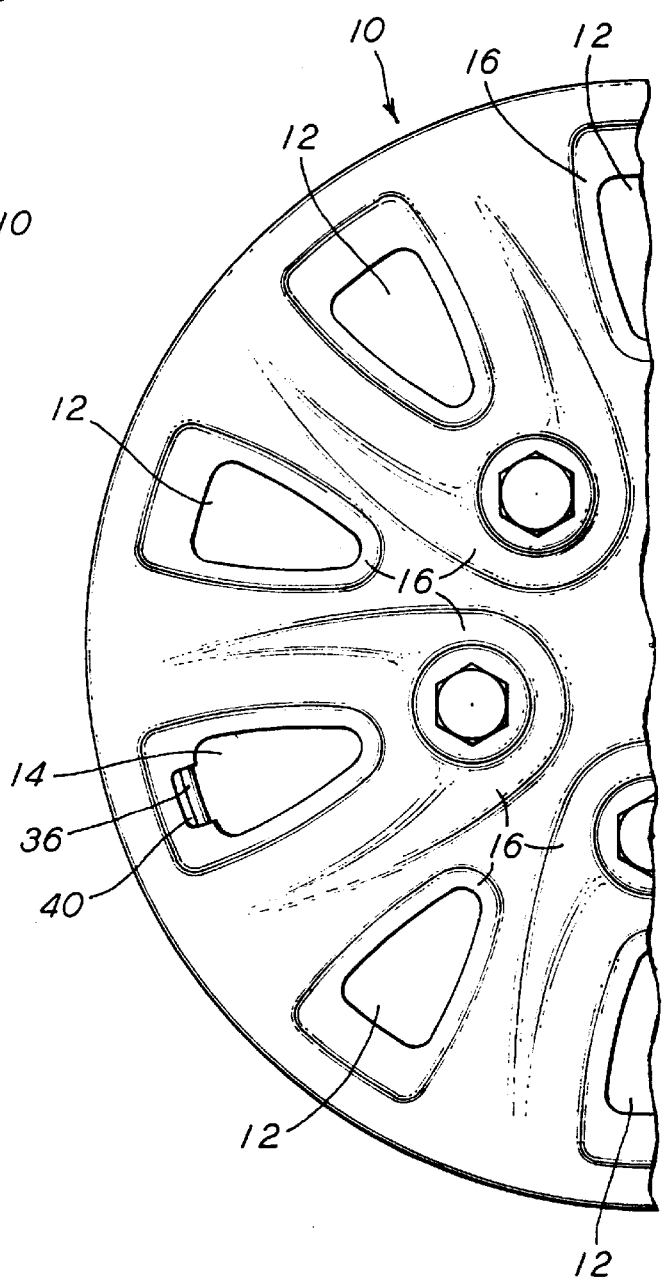
FIG. 1 is a partial plan view of a typical cover of a vehicle wheel.

Referring now to the drawings, FIG. 1 thereof shows in a partial plan view the front face of a typical motor vehicle removable wheel cover 10 provided with a plurality of ornamental openings 12 and 14, surrounded generally by authentically pleasing embossments and/or depressions 16. Behind the wheel cover is a plurality of retention teeth or fingers 18 attached to or integrally formed with the body of the cover in the case of the cover being made of a plastic material. Teeth 18 are forced outwardly by a circular continuous retention ring 20 made of a hard, durable metal wire or rod material, the continuous ring being held in place by the teeth 18 provided with inwardly facing indented portions 22 that seat and hold the ring in place.

Figure 2:
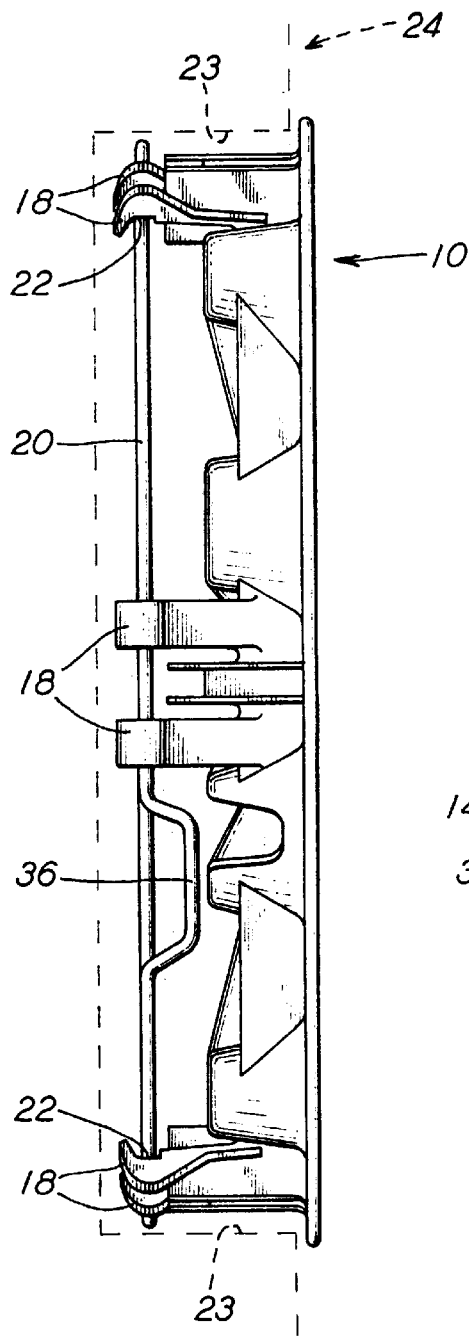
FIG. 2 is a side elevation view of the cover of FIG. 1.

Teeth 18 extend generally perpendicularly from the plane of the rear of cover 10 a distance sufficient to extend into and engage an inwardly facing surface 23 of a metal wheel 24 shown only schematically in dash out-line in FIG. 2. Teeth 18 engage surface 23 under substantial force to maintain cover 10 in place on the wheel. This force is provided by the retention ring 20. As discussed above, the force at which ring 20 maintains engagement of teeth 18 with wheel surface 23 is substantial in order to prevent cover 10 from separating from wheel 24 under rough road and other conditions that might be effective in dislodging the cover from the wheel.

Heretofore, in manually removing cover 10 from a wheel 24 required prying the cover from the wheel using a flat end tool inserted between the cover and wheel. The possibility of damaging the cover and injuring the hand of the user is substantial with such a tool, as again, the force at which ring 20 holds the cover in place is substantial.

Figure 3:
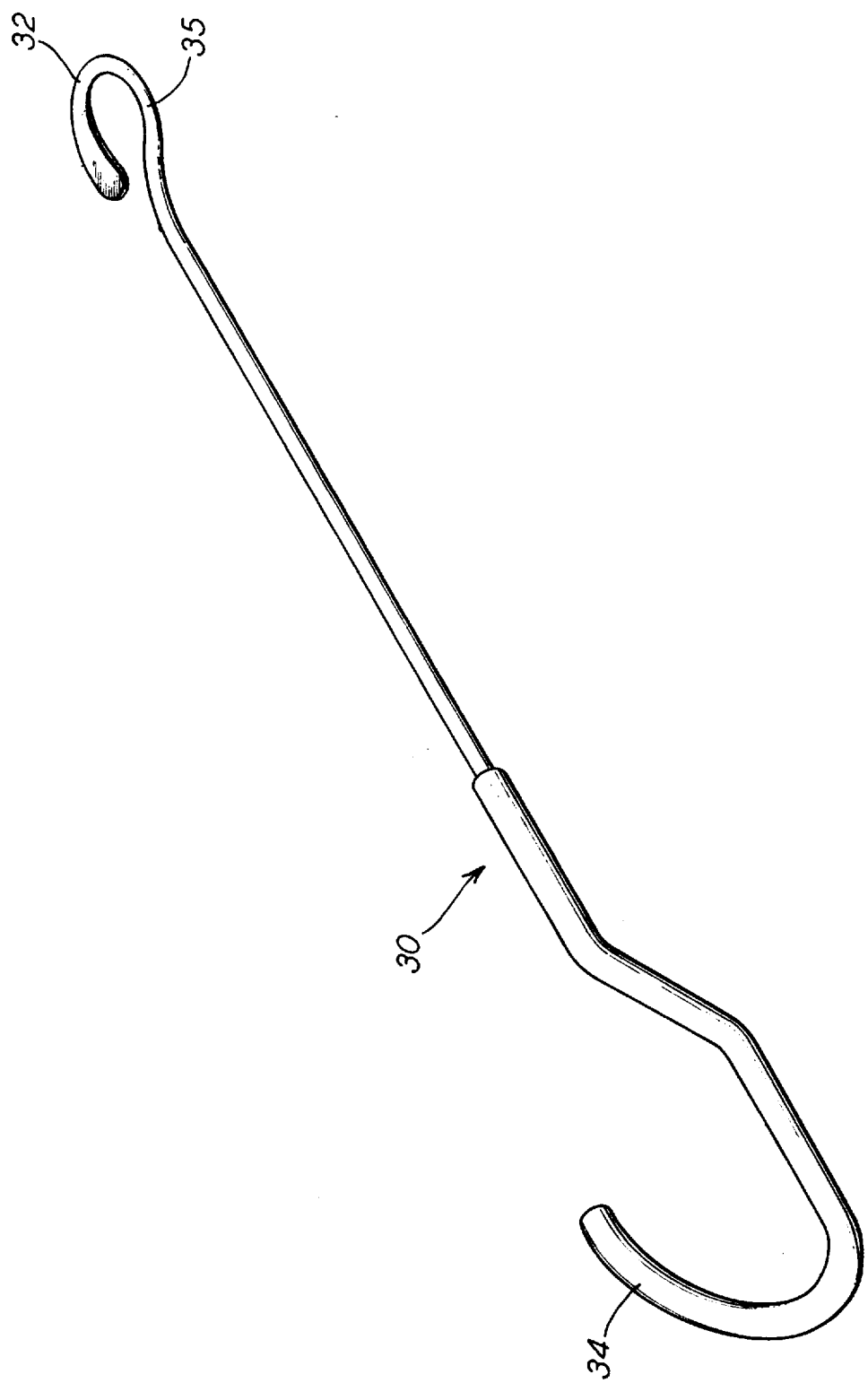
FIG. 3 is an isometric view of the tool of the invention for removing the cover of FIGS. 1 and 2.
Figure 4:
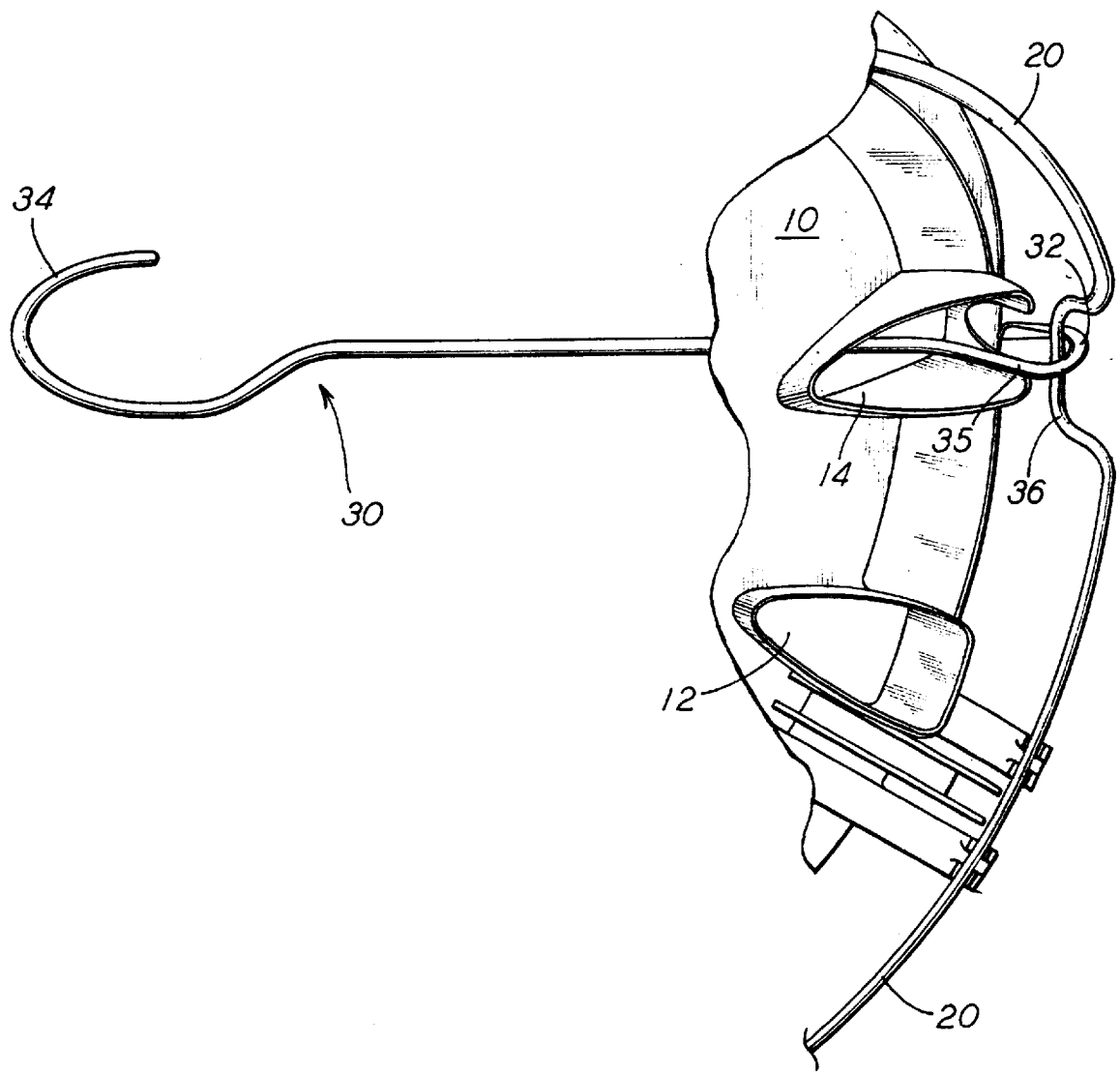
FIG. 4 is a partial plan view of the rear of a wheel cover, with one end of the tool of FIG. 3 inserted through an opening in the cover and engaging a retention ring of the cover.

FIGS. 3 and 4 of the drawings show a simple elongated tool 30 for easily removing a wheel cover 10 from a vehicle wheel (24) without (1) damaging the cover, (2) injuring the hand of the user and (3) wearing rim engaging surfaces of teeth 18. The tool has a forward end 32 in the form of a narrow, small radius hook and a remote or distal end 34 providing a handle for gripping by a user of the tool. As depicted in FIGS. 3 and 4, handle end 34 has a large radius section for easy grasping by the hand of the user, though other handle configurations or structures can be provided.

Preferably, tool 30 is made of integral, single piece, durable rod material. Such a tool is easily made at low cost. The tool can have, of course, a separate handle and grip means (not shown) made of any suitable material and secured to the remainder of the durable rod by any suitable means. In FIG. 3, the handle is shown coated with rubber-like material to make the grasping and use process easier on the hand of the user.

Tool 30 has a generally longitudinal axis that extends between the ends 32 and 34 of the rod material of the tool. The small radius end 32 of the tool is shown offset from the longitudinal axis in FIGS. 3 and 4 to facilitate engagement of tool end 32 with retention ring 20. In viewing FIG. 4 of the drawings, the offset in tool 30, which is labeled by numeral 35, positions end 32 relative to retention ring 20 in a manner that allows end 32 to slip past the ring when end 32 is inserted through an opening 14 in cover 10. Thus, with hook 32 being offset, less manipulation of tool 30 is required to position hook 32 behind spring rod 20.

As shown in FIG. 4, retention ring rod 20 can be provided with a generally rectangular (or circular) offset 36 to accommodate a valve stem (not shown) extending inwardly from rim portion 23. In FIG. 4, the small hook end 32 of tool 30 is shown extending about offset 36 for the purposes of removing cover 10 from wheel 24. In FIG. 1, the offset 36 is visible in an upper portion of an opening 14 in the cover. This opening is extended slightly at 40 to allow the valve stem to protrude through the cover.

Tool 30 is employed to remove a cover 10 from a wheel 24 in the following manner:

Handle 34 of tool 30 is grasped by the user and the user inserts end 32 of the tool through an opening 12 or 14 in cover 10. If the cover has a retention ring 20 provided with an offset 36, as shown in FIG. 4, the user can insert end 32 at the location of offset 36. Hook 32 is then slipped over offset 36 (in FIG. 4) and translated axially to locate offset 36 in the hook of 32.

The user now pulls on handle 34 in a direction crosswise wheel 24 and cover 10, and generally along their diameters, to move retention ring 20 inwardly toward the center of the wheel and away from rim 23 of the wheel. This relieves the outward force that ring 20 imposes on the teeth 18 located nearest the location at which hook 32 engages the ring, thereby removing the gripping force of such teeth against wheel surface 23. The cover is now loosened and freed to be separated from the wheel. This is accomplished without forcibly contacting the cover itself so that the cover is free from damaging contact by tool 30 and the hand of the user is free from possible injury and wear of teeth 18 is abated.

As explained earlier, tool 30 is simple to make and is low in cost. Yet it is highly effective in relieving the gripping force imposed on retention teeth 18 of a wheel cover by the tough and durable retention ring 20.

While the presently preferred embodiment for carrying out the instant invention has been set forth in detail above, those persons skilled in the wheel cover art to which this invention pertains will recognize various alternative ways of practicing the invention without departing from the spirit and scope of the claims appended hereto.

I claim:

1. A method of removing a wheel cover from a wheel of a motor vehicle, said wheel cover having a retention ring disposed to secure said wheel cover to said wheel, said method comprising:

engaging a portion of said retention ring with a hook of an elongated tool having a handle for gripping said tool, and pulling said handle of said tool crosswise of said wheel to pull said portion of said retention ring engaged by said hook toward a center of said wheel to thereby release said wheel cover from said wheel.

\* \* \* \* \*